(12) United States Patent
Griffin et al.

(10) Patent No.: US 11,904,895 B2
(45) Date of Patent: Feb. 20, 2024

(54) DUAL-MODE CRUISE CONTROL

(71) Applicant: Micron Technology, Inc., Boise, ID (US)

(72) Inventors: Amy Rae Griffin, Boise, ID (US); Xiao Li, Boise, ID (US); Maria Pat F. Chavarria, Boise, ID (US); Alpha Chavez Labiano, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 138 days.

(21) Appl. No.: 17/109,501

(22) Filed: Dec. 2, 2020

(65) Prior Publication Data

US 2022/0169285 A1    Jun. 2, 2022

(51) Int. Cl.
*B60W 60/00* (2020.01)
*B60W 30/14* (2006.01)
*B60W 30/16* (2020.01)

(52) U.S. Cl.
CPC ...... *B60W 60/0016* (2020.02); *B60W 30/143* (2013.01); *B60W 30/16* (2013.01); *B60W 2556/45* (2020.02)

(58) Field of Classification Search
None
See application file for complete search history.

(56) References Cited

U.S. PATENT DOCUMENTS

2009/0105923 A1*  4/2009  Etori .................. B60W 10/18
                                              701/96
2017/0329348 A1* 11/2017  Li .................... G08G 1/22

OTHER PUBLICATIONS

Wikipedia, "Flash Memory", Nov. 28, 2020, Wikipedia, 1 (Year: 2020).*
Wahlstrom, Johan, "Sensor Fusion for Smartphone-based Vehicle Telematics", 2017, KTH Royal Institute of Technology School of Electrical Engineering Information Science and Engineering Stockholm, Sweden, 49, 67, 72, 114-117 (Year: 2017).*
Fenske et al., "DLP® DMD Technology: Lidar ambient light reduction", Sep. 2018, Texas Instruments, 2, 12 (Year: 2018).*
ATP Inc., "Understanding RAM and DRAM Computer Memory Types", 2018, ATPInc.com, 1 (Year: 2018).*

* cited by examiner

*Primary Examiner* — Alan D Hutchinson
*Assistant Examiner* — Andy Schneider
(74) *Attorney, Agent, or Firm* — Greenberg Traurig (57) ABSTRACT

Systems, methods, and apparatus related to cruise control for a vehicle. In one approach, speed for a first vehicle is controlled in a first mode using data from sensors. The speed is controlled while keeping at least a minimum distance from a second vehicle being followed by the first vehicle. In response to determining that data from the sensors is not usable to control the first vehicle (e.g., the data cannot be used to measure the minimum distance), the first vehicle changes from the first mode to a second mode. In the second mode, the first vehicle maintains a constant speed and/or obtains additional data from sensors and/or computing devices located externally to the first vehicle. In another approach, the additional data can additionally or alternatively be obtained from a mobile device of a passenger of the first vehicle. The additional data is used to maintain a safe minimum distance from the second vehicle.

17 Claims, 6 Drawing Sheets

DUAL-MODE CRUISE CONTROL

FIELD OF THE TECHNOLOGY

At least some embodiments disclosed herein relate to electronic control systems in general, and more particularly, but not limited to a computing system for implementing multiple-mode speed control for a vehicle.

BACKGROUND

An advanced driver-assistance system (ADAS) is an electronic system that aids a driver of a vehicle while driving. ADAS provides for increased car safety and road safety. ADAS systems use electronic technology, such as electronic control units and power semiconductor devices. Most road accidents occur due to human error. ADAS, which automates some control of the vehicle, can reduce human error and road accidents. ADAS is generally designed to automate, adapt, and enhance vehicle systems for safety and improved driving.

Safety features of ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert a driver to other cars or dangers, provide a lane departure warning system, provide automatic lane centering, show a field of view in blind spots, or connect to navigation systems.

Besides cars and trucks, ADAS or analogous systems can be implemented in vehicles in general. Such vehicles can include boats and airplanes, as well as vehicles or vehicular equipment for military, construction, farming, or recreational use. Vehicles can be customized or personalized via vehicle electronics and ADAS.

Vehicle electronics can include various electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion-powered machinery. Related elements for control of electrical vehicular systems are also found in hybrid and electric vehicles such as hybrid or electric automobiles. For example, electric cars can rely on power electronics for main propulsion motor control and managing the battery system.

For ADAS and other types of vehicle systems, vehicle electronics can be distributed systems. Distributed systems in vehicles can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems.

A vehicle using automation for complex tasks, including navigation, is sometimes referred to as semi-autonomous. The Society of Automotive Engineers (SAE) has categorized vehicle autonomy into six levels as follows: Level 0 or no automation. Level 1 or driver assistance, where the vehicle can control either steering or speed autonomously in specific circumstances to assist the driver. Level 2 or partial automation, where the vehicle can control both steering and speed autonomously in specific circumstances to assist the driver. Level 3 or conditional automation, where the vehicle can control both steering and speed autonomously under normal environmental conditions, but requires driver oversight. Level 4 or high automation, where the vehicle can travel autonomously under normal environmental conditions, not requiring driver oversight. Level 5 or full autonomy, where the vehicle can travel autonomously in any environmental conditions.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for dual or multi-mode cruise or speed control systems as used in vehicles. At least some embodiments herein relate to a computing device that changes between operating modes for a cruise control system based on the quality and/or usefulness of the data provided from one or more sensors of a vehicle (e.g., a camera mounted on the front of a vehicle). In one example, a computing device of an autonomous vehicle switches to an alternate operating mode for controlling the speed of the vehicle when sensor data in an initial mode is degraded (e.g., due to a sensor failure) and cannot be used to safely control the speed of the vehicle because the sensor data is not usable to measure a distance to other vehicles.

A conventional vehicle provides a cruise control mechanism that can automatically maintain the speed of a vehicle to compensate for disturbances, such as hills, wind, etc. However, a conventional cruise control mechanism does not have the capability to make adjustments to avoid a collision with another vehicle traveling in front of it.

Recent developments in advanced driver-assistance systems (ADAS) provide functionality such as adaptive cruise control (ACC) that automatically adjusts the vehicle speed to maintain a safe distance from the vehicle(s) ahead. However, when a vehicle using ACC is traveling, for example, facing the direction of sunlight, the direct sunlight received in a camera of used by the ACC system can degrade the ability of the ACC to maintain a safe distance from the vehicle(s) ahead. Currently, the ACC system simply disables the cruise control and returns control of the vehicle to the driver. This occurs even in situations where it is safe to use the conventional cruise control. Disabling cruise control completely in this manner can be inconvenient to the driver. In other cases, it can create a safety hazard by causing the vehicle to suddenly slow down. As a result, a vehicle following too closely behind may collide with the slowing vehicle.

Various embodiments of the present disclosure provide a technological solution to one or more of the above technical problems. In one embodiment, to overcome the deficiency of existing adaptive cruise control (ACC), an improved system is configured to switch between a conventional cruise control mode, and an automatic adaptive cruise control mode. In one example, a vehicle switches back-and-forth between such modes depending on current vehicle and/or environment conditions (e.g., whether direct or stray sunlight is striking sensors of the vehicle). When the system determines that sensing/measuring by a camera and/or other sensor is impaired (e.g., due to direct sun light into the camera), the system changes to a conventional cruise control mode and requires that the driver keep a safe distance from the vehicle(s) ahead. Thus, the driver can still enjoy the conventional cruise control function (e.g., even when driving into the sun). The vehicle alerts the driver prior to changing to the conventional cruise control mode, and requires confirmation from the driver prior to changing the mode. In one example, the driver is alerted and can select either to change to conventional cruise control, or return to full manual control by the driver.

In one embodiment, a speed of a first vehicle is controlled, in a first mode using data from at least one sensor. The speed in the first mode is controlled to maintain at least a minimum distance (e.g., using ACC) from a second vehicle. A determination is made (e.g., by a controller of the first vehicle) that the data from the sensor is insufficient (e.g., not sufficiently usable for determining a distance) to control the speed of the first vehicle (e.g., the sensor data does not permit the vehicle to determine the distance to the second vehicle with acceptable accuracy). In response to determining that the data from the sensor is insufficient, the first vehicle changes operation from the first mode to a second mode for controlling the speed. Controlling the speed in the second mode includes maintaining a speed (e.g., using conventional cruise control).

In one embodiment, a first vehicle is operated in a first mode using data from one or more sensors to control a speed of the first vehicle while maintaining at least a minimum distance from a second vehicle. It is determined that the data from the sensor is not usable to measure a distance from the first vehicle to the second vehicle (e.g., due to sunlight shining on a camera lens). In response to determining that the data from the sensor is not usable to measure the distance, the first vehicle is operated in a second mode to maintain a constant speed of the first vehicle. The driver is alerted and required to approve the second mode, and the second mode includes continuing to maintain a constant speed (e.g., control to a speed set point), but without using the distance control as in ACC. The driver is responsible for watching the second vehicle and manually braking the first vehicle as required for safe operation when in the second mode. In one example, the driver would not be able to discern that the first vehicle is operating in the second mode as the same speed is maintained. Thus, the alert and approval of the driver is required as described herein to avoid causing a vehicle operation safety risk.

In one example, the vehicle changes from normal ACC operation in a first mode to operation in a second mode where the vehicle is kept at a constant speed and without requiring that distance to the second vehicle be sufficiently measurable. The driver is required to provide confirmation via a user interface before the vehicle continues to maintain speed. In one example, the maintained speed is the speed of the first vehicle at the time when it is determined that the sensor data is insufficient to measure a distance from the first vehicle to the second vehicle. In one example, the maintained speed is a set point speed that was being used to control speed when in the first mode.

In one example, a vehicle uses ACC in a first mode. In the second mode, the ACC continues to operate, but a processor temporarily ignores an inability to measure a distance from the first vehicle to the second vehicle due to insufficient sensor data (e.g., camera is disabled by direct or stray sunlight, or light from a headlight or street light so that a distance to the second vehicle is not able to be measured in the event that there were an actual emergency need for slowing down the vehicle to avoid a collision). The temporary ignoring is subject to the driver providing a positive confirmation that operation in the second mode is permitted. This is to make the operation of the vehicle safer. The vehicle returns to the first mode when the sensor data again permits measuring the distance to the second vehicle. The driver is alerted of the return to the first mode by a user interface indication (e.g., a visual and/or sound indication).

In one example, the first vehicle operates in ACC in the first mode. Operation is the same or similar to conventional cruise control in that a constant speed is maintained. The first vehicle further monitors the distance to other objects (e.g., the second vehicle being followed). When operation of the first vehicle is changed to the second mode, the constant speed is maintained, but the distance measurement capability has been lost, or is below an acceptable standard (e.g., an accuracy or precision threshold). The driver is required to approve operation in the second mode prior to the change from the first mode to the second mode.

In one example, the first vehicle when in the first mode operates similarly to a conventional ACC system. The ACC system is implemented by the first vehicle to maintain a selected speed with a safety requirement of not approaching too closely to the second vehicle ahead (e.g., a safe minimum distance is maintained). In the case that the second vehicle speed may exceed the first vehicle's speed, so that the second vehicle speeds away faster than the cruise speed set by an operator for the first vehicle, then the ACC system will not cause the first vehicle to speed up to chase the second vehicle ahead. In the case where there would be no second vehicle ahead, the ACC operates in the same or similar way as a conventional cruise control operates when in the first mode.

In the first mode, the ACC system slows down the speed of the first vehicle if the distance to the second vehicle ahead is determined to be less than a minimum safe distance. In some cases, for example, the safe distance can change in some cases, but the ACC system avoids a collision. If ACC system loses the ability to maintain a safe distance for collision avoidance, then the first vehicle can require that the operator confirm switching to the second mode before switching is performed. This is so because, in some cases, it may not be safe to keep the first vehicle running at the cruise speed of the first mode set by the operator. There may in some cases be a risk that the ACC system is not able to automatically avoid colliding into the second vehicle (e.g., due to sensors being temporarily disabled due to sunlight).

In one example, the data is insufficient for use in providing safe control of the vehicle due to direct sunlight as mentioned above. In other examples, a lens or other sensor component may be dirty and/or obscured (e.g., by mud). In one example, changing precipitation or other weather conditions changes the sufficiency of data. In one example, an external light source causes sensor data degradation, such as a stray headlight from another vehicle or object.

In some embodiments, changing (e.g., switching or transfer) of cruise control modes is controlled to keep a minimum safe distance during cruise control operation. A vehicle is configured to perform either of adaptive cruise control or conventional cruise control. The conventional cruise control maintains the speed of the vehicle without the driver having to manually control the acceleration paddle. The adaptive cruise control maintains a safe distance away from one or more vehicles ahead (and also maintains a constant speed when possible).

In one embodiment, when the vehicle is switched to the conventional cruise control, the vehicle is configured to actively transfer control to the driver for keeping a safe distance from the vehicle(s) ahead. For example, the vehicle can be configured to disable adaptive cruise control and provide an indication to the driver that the vehicle is temporarily unable to maintain a safe distance in an autonomous mode. The vehicle thus requires the driver to engage (e.g., using a separate user interface from the ACC user interface) conventional cruise control.

In one example, the vehicle is configured to automatically switch from adaptive cruise control to conventional cruise control with a voice prompt reminding the driver to control distance. In one example, the vehicle has a warning light that is turned on automatically when the vehicle is in the conventional cruise control mode. In one example, the vehicle requires a driver/user confirmation in order to enter the conventional cruise control mode.

In one embodiment, the speed of a first vehicle is controlled in a first mode using data from one or more sensors (e.g., cameras and/or lidar sensors) of the first vehicle. The speed is controlled to maintain a minimum distance (e.g., a user-selected or dynamically-determined safe distance) from a second vehicle (e.g., the first vehicle is following the second vehicle on the same road or in the same lane of a highway). The data from the sensor(s) is evaluated (e.g., using an artificial neural network). Based on evaluating the data from the sensor, the first vehicle is switched from the first mode to a second mode for controlling the speed (e.g., based on the evaluation, the sensor data is found to be excessively noisy and/or degraded, and is now unusable).

In the second mode, additional data is collected from a new source (e.g., another vehicle or a computing device located externally to the first vehicle). The additional data is then used to maintain the minimum distance (e.g., so that the first vehicle can continue to operate adaptive cruise control that was earlier engaged by the operator, such as a driver).

In one embodiment, a camera of another vehicle is used to provide data for continuing use of adaptive cruise control (ACC). In one example, an autonomous vehicle temporarily uses camera vision/image data from the camera of the other vehicle over a communication link to facilitate the ACC. The use of the camera is ended when it is determined that sensor data for the immediate vehicle of the driver (or passenger in the case of an autonomous vehicle) is restored to a usable quality (e.g., the direct sun is gone because the sun has set, or the direct sun is gone because the sun has risen sufficiently high in the sky).

In one example, when the camera of a vehicle is disabled due to direct sunlight striking it, the vehicle obtains images from an adjacent vehicle (e.g., a vehicle within 10-50 meters or less), a surveillance camera configured along the roadway being traveled, and/or a mobile device (e.g., cellphone). The obtained images are used to gauge the distance from the one or more vehicles ahead of the immediate vehicle of the driver. The immediate vehicle can measure the position and/or orientation of the images from the temporarily-used camera of the other vehicle. Using this data, the immediate vehicle can convert, based on the distances between vehicle(s) ahead as determined using the temporary camera, to distances between the immediate vehicle and the other vehicles. In some embodiments, data from one or more other sensors or other input from the other vehicle is additionally used, and not merely data from the camera of the other vehicle.

In one embodiment, data from a mobile device is used to assist in operating the adaptive cruise control (ACC). A mobile application running on a mobile device is configured to identify vehicle(s) captured by its camera, and to measure a distance to the vehicle(s). When a camera used by the ACC is blinded by, for example, direct sunlight, the mobile device (e.g., smartphone) can be placed in the vehicle so that it has a clear view of the road ahead (e.g., without being blinded by the direct sunlight). The mobile application transmits distance information (e.g., using a standardized protocol) to a processing device of the immediate vehicle that is operating the ACC. Then, the ACC is able to continue operating with its normal, full functionality.

In one embodiment, an immediate vehicle of an operator (e.g., driver or passenger) is driven in a city having a data infrastructure (e.g., a Smart City) and additional data is provided to the vehicle by telematics (e.g., satellite communication) or other wireless communication (e.g., cellular) for use in implementing or assisting adaptive cruise control (ACC). In one example, an autonomous vehicle communicates with the infrastructure to obtain data regarding vehicle-to-obstacle distance(s). The communications can be, for example, done using communication channels (e.g., communications with 4G or 5G cellular stations). In one example, when the camera used by ACC is blinded by direct sunlight or otherwise obscured, the immediate vehicle can request distance information from the infrastructure to continue its operation (e.g., maintaining a safe distance from the vehicle(s) ahead).

Figure 1:
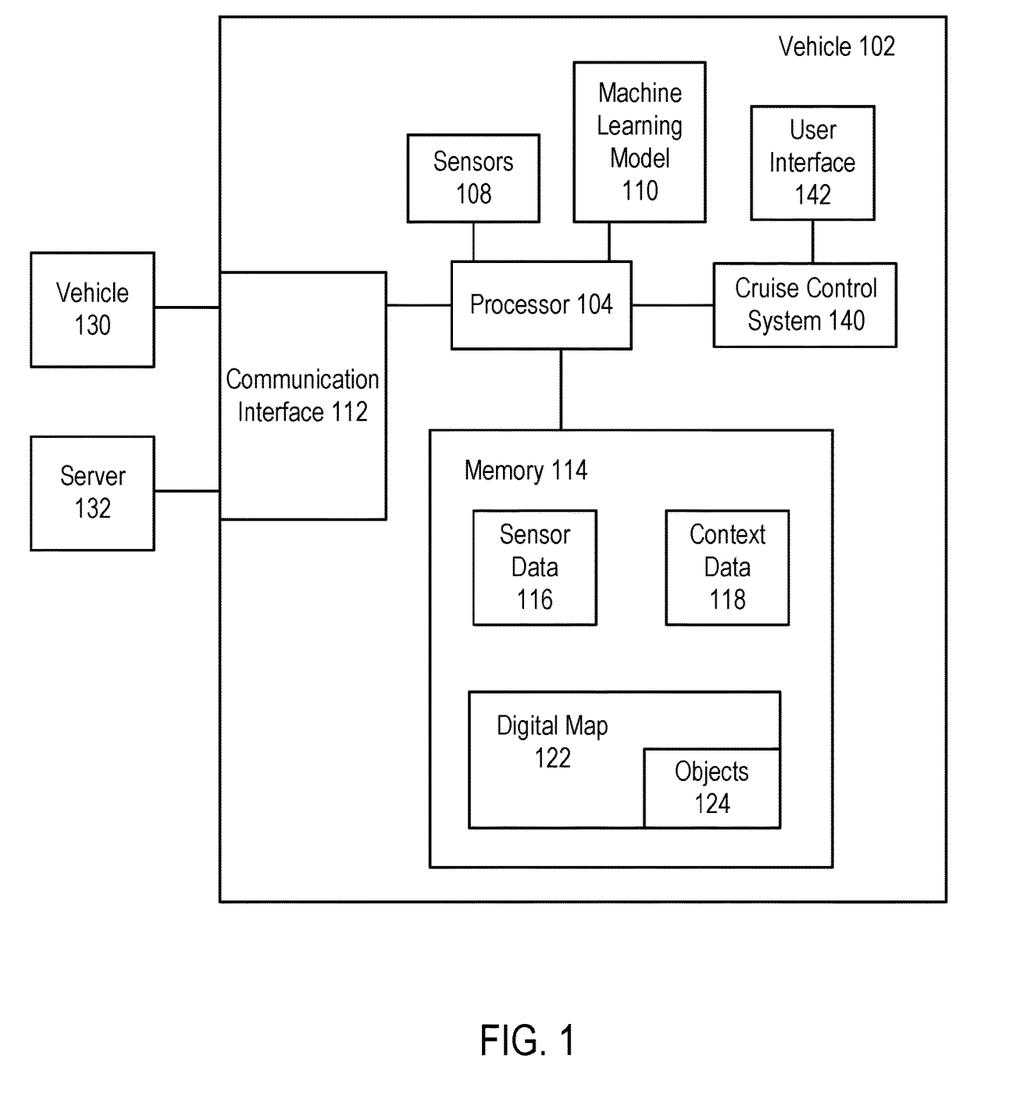
FIG. 1 shows a vehicle including a cruise control system that operates in at least two modes, in accordance with some embodiments.

FIG. 1 shows a vehicle 102 including a cruise control system 140 that operates in at least two modes, in accordance with some embodiments. In one embodiment, the first mode uses adaptive cruise control, and the second mode uses conventional cruise control. First and second modes are described below for purposes of illustration. In other embodiments, three or more modes can be used (e.g., as a combination of various modes described herein).

In one example, vehicle 102 determines that data obtained from sensors 108 and being used by cruise control system 140 for adaptive cruise control has become insufficient to properly control the speed of vehicle 102. In one example, vehicle 102 is not able to safely use data from a camera to maintain a minimum safe distance from another vehicle being followed by vehicle 102. In response to determining that the sensor data is insufficient, processor 104 switches the operation of cruise control system 140 from the first mode to the second mode. In the second mode, the driver is required to manually brake vehicle 102 and/or disable cruise control system 140 if vehicle 102 approaches too closely to another vehicle or object.

In one embodiment, the first and second modes of cruise control system 140 each use adaptive cruise control. In the first mode, cruise control system 140 only uses data provided by sensors 108 and/or other sensors or sources of data of vehicle 102. In the second mode, cruise control system 140 obtains additional data from a new source other than vehicle 102 itself (e.g., a sensor, computing device, and/or data source that is located external to the vehicle 102, such as being a component of a smart city traffic control infrastructure).

In one example, the new source is vehicle 130. Vehicle 102 communicates with vehicle 130 using communication interface 112. In one example, vehicle 130 is traveling in the lane next to vehicle 102 on the same multi-lane highway.

In one example, the new source is server 132 (e.g., an edge server in a communication network). Vehicle 102 communicates with server 132 using communication interface 112. In some cases, vehicle 130 and/or server 132 provide data used to update digital map 122, which is stored in memory 114. Memory 114 is, for example, volatile and/or non-volatile memory. In one example, memory 114 is NAND flash memory of a memory module (not shown) of vehicle 102.

In one embodiment, a decision to switch from the first mode to the second mode while staying in adaptive cruise control is based on evaluating data from sensors 108. In one example, machine learning model 110 is used to evaluate the sensor data. In one example, data from sensors 108 is an input to machine learning model 110. Another input to machine learning model 110 may include context data 118 regarding the current and/or previous operational context of vehicle 102. An output from machine learning model 110 can be used to determine whether data from sensors 108 is considered to be sufficient for safe control of vehicle 102 when in the first mode of operation by cruise control system 140.

Processor 104 controls the receiving of data from sensors 108, and the signaling of cruise control system 140 based on one or more outputs from machine learning model 110. Processor 104 also manages the storage of sensor data 116, which is obtained from sensors 108, in memory 114.

Processor 104 provides data regarding objects 124 to cruise control system 140. Objects 124 include objects that have been identified (e.g., type of object, location of object, etc.) by machine learning model 110. The data regarding objects 124 is used by cruise control system 140 to assist in determining whether a minimum safe distance is being maintained by vehicle 102 away from other vehicles or objects.

Processor 104 manages user interface 142 for receiving inputs from an operator of vehicle 102 regarding settings to use in implementing adaptive cruise control. In one example, the setting is a set point for a desired speed to be maintained. In one example, the setting alternatively and/or additionally includes a desired minimum distance to use when following another vehicle. In one example, machine learning model 110 generates the set point based on context data 118.

In one example, when using a cruise control mode of operation, processor 104 dynamically determines a minimum distance to maintain in real-time during vehicle operation based on a context of the vehicle (e.g., speed, weather, traffic, etc.). In one example, the minimum distance is determined at least every 1-30 seconds. In one example, the minimum distance is selected by a user. In one example, the minimum distance is a fixed value selected by a controller of the vehicle when the cruise control is engaged, and/or when there is a change in a mode of operation of the cruise control.

Cruise control system 140 provides data to the operator on user interface 142. In one example, this provided data includes an operational status of any current cruise control being implemented. In one example, the provided data indicates the mode in which cruise control system 140 is operating. In one example, the provided data provides an indication to the operator that cruise control system 140 will be switching from the first mode to a second mode. In one example, cruise control system 140 requires that the operator provide confirmation in user interface 142 prior to switching to the second mode.

In one example, when operating in the first mode, cruise control system 140 maintains a selected speed, but subject to maintaining a minimum distance from another vehicle. In one example, when operating in the first mode, cruise control system 140 maintains a selected distance from another vehicle, but subject to maintaining a maximum speed. In one example, the selected distance is a range above and below a set point target distance behind the other vehicle. For example, the set point is 100 meters, and the range is plus or minus 30 meters. In one example, the selected distance is dynamically determined in real-time based on a context of the vehicle, such as speed, weather, traffic, etc.

In one embodiment, cruise control system 140 causes a switch from the first mode to the second mode based on determining that data provided by one or more sensors 108 does not satisfy a criterion. In one example, the criterion is an output from machine learning model 110, as discussed above. In one example, the criterion is a selected or target (e.g., fixed or dynamically-determined threshold limit) measure of maximum noise that is accepted in the data from sensors 108. In one example, the criterion is responsiveness of vehicle 102 to command signals from cruise control system 140 (e.g., as compared to the expected responsiveness to data received from sensors 108 based on the prior operating history).

In one example, the criterion is a score determined by cruise control system 140 using context data 118, an output from machine learning model 110, and/or data received from vehicle 130 and/or server 132. In one example, the criterion is an extent of resolution and/or object identification that is achieved based on image processing of data from sensors 108. In one example, the criterion is any combination of the foregoing criteria. In one example, the criterion is dynamically determined by cruise control system 140 while the vehicle 102 is in motion.

Figure 2:
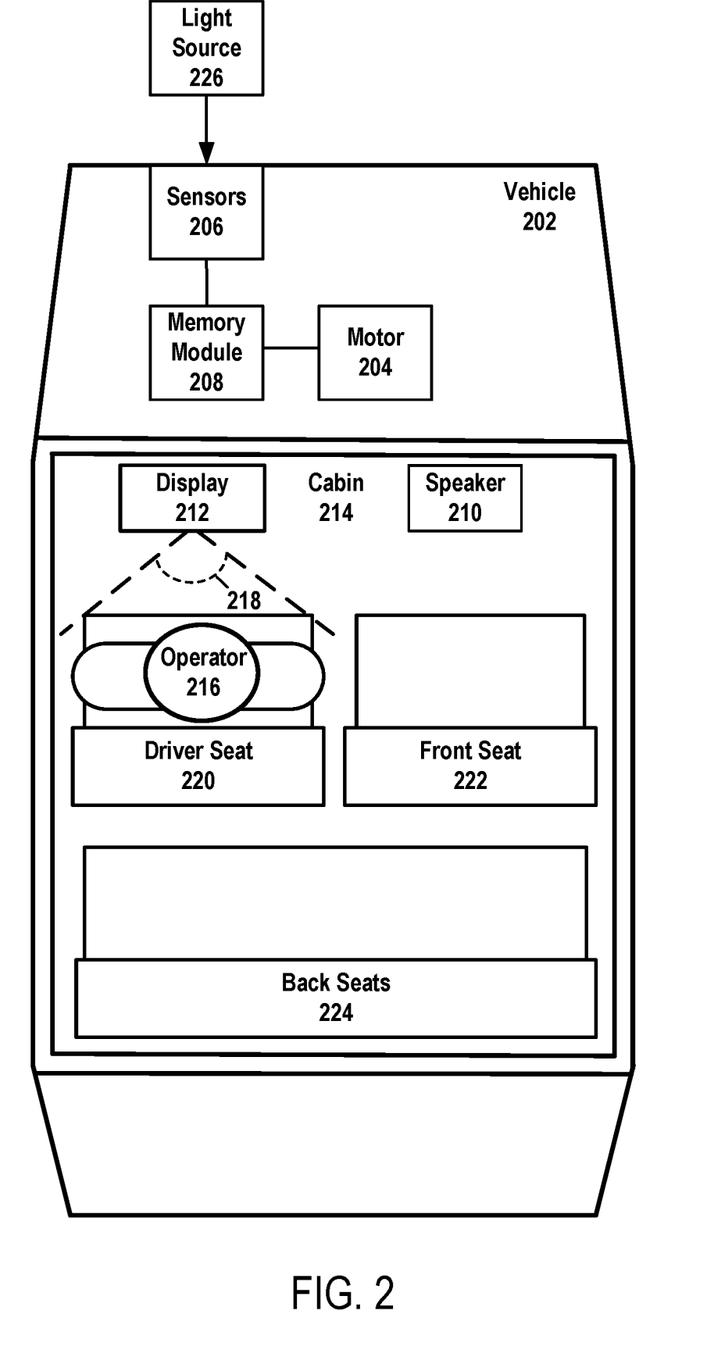
FIG. 2 shows a vehicle that uses data provided by sensors for controlling various functions of the vehicle, in accordance with some embodiments.

FIG. 2 shows a vehicle 202 that uses data provided by one or more sensors 206 for controlling various functions of vehicle 202, in accordance with some embodiments. In one example the functions can be controlled by vehicle electronics including one or more computing devices coupled to one or more memory modules. For example, the functions can include control of, and/or signaling or other communications with one or more of: a powertrain control module and powertrain electronics, a body control module and body electronics, interior electronics, chassis electronics, safety and entertainment electronics, electronics for passenger and driver comfort systems, and/or vehicular automation. The computing devices can implement the functions using one or more of mechatronics, artificial intelligence (e.g., machine learning models including artificial neural networks), or distributed systems (e.g., systems including electronic components connected by a controller area network (CAN) bus). In one example, the functions include determining a route and/or controlling navigation of a vehicle.

In one example, sensor 206 is part of a sensing device (e.g., a sensing device in an encapsulated package) that includes an integrated processor and memory device. The processor executes an artificial neural network (ANN) that locally processes data collected by sensor(s) 206 for use as an input to the ANN. An output from the artificial neural network is sent to a processing device (not shown) (see, e.g., processor 104 of FIG. 1) for controlling a function of vehicle 202.

Data received from sensor(s) 206 is stored in memory module 208. In one example, this stored data is used to control motor 204. In one example, motor 204 is an electric motor of an autonomous vehicle. In one example, motor 204 is a gasoline-powered engine.

Vehicle 202 can operate in various modes of operation. In a first mode, data from sensor 206 is used to control the speed of vehicle 202 via signaling the electronics of motor 204. In the first mode, vehicle 202 operates using adaptive cruise control. When an external light source 226 emits light that strikes sensor 206 and causes distortion in interpretation of data provided by sensor 206 for operation of the adaptive cruise control, a processing device (not shown) (see, e.g., processor 104 of FIG. 1) determines that data from sensor 206 is insufficient to control the speed of vehicle 202.

In one example, light source 226 is the sun or a headlight of an oncoming vehicle. Sunlight shining directly in front of vehicle 202 such as at sunrise or sunset can cause existing cruise control systems to malfunction or stop working. In one example, the direct sunlight can disable cruise control for a car that is using both speed and distance monitoring in a first mode of cruise control. In one example, cruise control system 140 determines that such sunlight is interfering with cruise control operation. In response to this determination, cruise control system 140 switches from the current, first mode of operation to a second mode of operation, such as described herein. In one example, vehicle 202 avoids the sunlight problem by obtaining information from sensors located in another object, such as a different vehicle, a computing device outside of vehicle 202, and/or a part of transportation communication infrastructure (e.g., a smart city infrastructure). In one example, the other object is not suffering from the direct sunlight distortion problem.

In response to the determination that stray light is causing distortion or another problem, the processing device switches vehicle 202 for operation in a second mode (e.g., using conventional cruise control). In the second mode, the processing device maintains a selected speed for vehicle 202. In one example, the selected speed is a set point used for determining a maximum speed of vehicle 202 when operating in the first mode.

Cabin 214 is part of the interior of vehicle 202. Cabin 214 includes display 212 and speaker 210. Display 212 and/or speaker 210 can be used to provide an alert to operator 216 that vehicle 202 will be and/or is currently switching from a first mode to a second mode of cruise control, as described above. In one example, the alert presents one or more selection options to operator 216 for customizing operation of vehicle 202 when operating in the second mode. In one example, operator 216 makes a selection of the desired option on display 212 and/or using a voice command, or other user input or control device located in cabin 214. Cabin 214 further includes driver seat 220 on which operator 216 sits, a front seat 222 for a passenger in the front of cabin 214, and back seats 224 for additional passengers in the rear of cabin 214.

In one example, the set point used to control the speed of vehicle 202 is selected by operator 216 using a user interface presented on display 212, which provides a field of view 218 in which operator 216 is able to see the user interface. In one example, the set point is selected by operator 216 using a voice command provided as an input to a microphone (not shown) in cabin 214 (or a voice command to a mobile device of operator 216 that communicates with vehicle 202). In one example, the voice command is processed by the processing device of vehicle 202 described above.

In one embodiment, memory module 208 stores data regarding operating characteristics of motor 204 while in the first mode of operation (e.g., adaptive cruise control). In one example, these stored characteristics are part of context data 118. In one example, these stored characteristics in memory module 208 are used by machine learning model 110 to make a determination whether data from sensor 206 is sufficient to control the speed of vehicle 202.

In one embodiment, memory module 208 stores data regarding the operating characteristics of motor 204 while in the first mode of operation. In one example, machine learning model 110 uses these stored operating characteristics as an input when evaluating data from sensors 206 and/or other sensors for sufficiency (e.g., noise or errors are below a threshold). In one example, based on an output from machine learning model 110, vehicle 202 switches from the first mode to a second mode of operation.

In one embodiment, vehicle 202 remains in adaptive cruise control in both the first mode and the second mode, but vehicle 202 obtains additional data from a new source for use in controlling the speed of vehicle 202 (e.g., in order to maintain a minimum distance from another vehicle being followed by vehicle 202). In one example, vehicle 202 obtains the additional data from vehicle 130 and/or server 132 using communication interface 112. In one example, the additional data is obtained from a mobile device (not shown) of a passenger in vehicle 202, a mobile device of a pedestrian on a road being used by vehicle 202, and/or a passenger of another vehicle.

Figure 3:
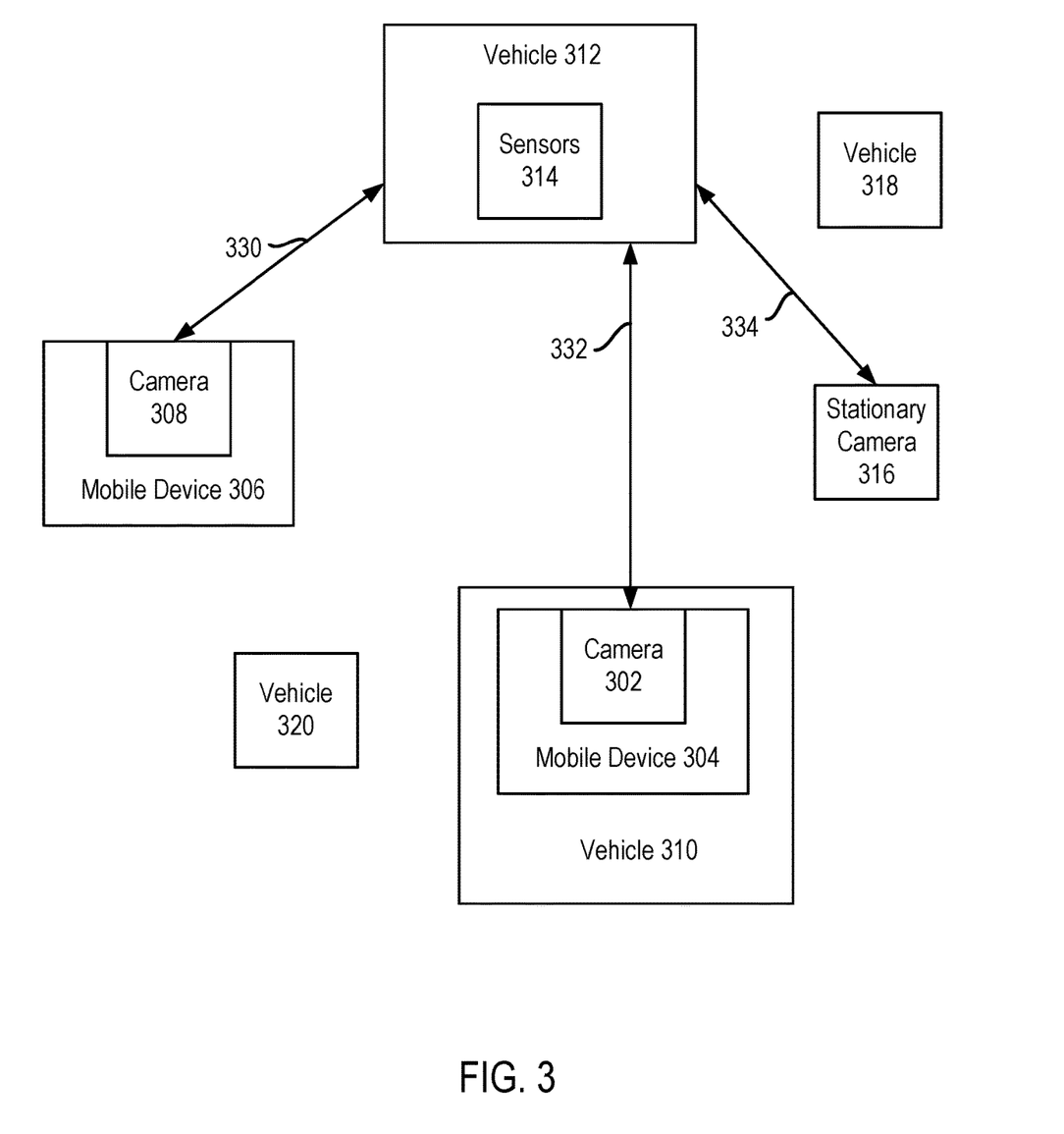
FIG. 3 shows a vehicle that controls its operation using data collected from one or more objects other than the vehicle, such as another vehicle or a mobile device, in accordance with some embodiments.

FIG. 3 shows a vehicle 310 that controls its operation using data collected from one or more other objects such as another vehicle or a mobile device, in accordance with some embodiments. For example, vehicle 310 is following another vehicle 312. In one example, vehicle 310 is following using adaptive cruise control in a first mode (e.g., a normal or default operating mode). Vehicle 310 is an example of vehicle 102 or vehicle 202.

In one example, vehicle 310 controls its speed to maintain a selected distance (e.g., a distance set point) behind vehicle 312. In one example, the selected distance is determined based on an output from machine learning model 110, which is based on inputs from context data 118, digital map 122, and/or sensor data 116.

In one embodiment, vehicle 310 determines that data provided by one or more sensors (e.g., sensors 108) of vehicle 310 do not satisfy a criterion. In one example, this determination is made by machine learning model 110. In one example, the criterion is a measurement or value corresponding to an extent of noise in the provided sensor data. In response to determining that the data from the one or more sensors does not satisfy the criterion, vehicle 310 switches from the first mode to a second mode for controlling vehicle 310 (e.g., speed, motor control, braking, and/or directional control).

In one embodiment, vehicle 310 remains operating in adaptive cruise control while in the second mode, but obtains additional data from one or more new sources of data. The new source can include one or more of mobile device 304, mobile device 306, vehicle 312, vehicle 318, vehicle 320, and/or stationary camera 316. In one example, vehicle 310 communicates with the one or more new sources using communication interface 112. In one example, the new source can include server 132.

In one example, camera 302 of mobile device 304 collects image data regarding vehicle 312. Mobile device 304 can be operated or held by a passenger in vehicle 202. In one example, the image data is processed by processor 104 and used to control cruise control system 140. For example, image data can be used to determine distance 332 between mobile device 304 and vehicle 312. Distance 332 can be used by cruise control system 140 when controlling the speed of vehicle 310.

In one example, mobile device 306 is held or operated by a pedestrian on a sidewalk of a road being traveled by vehicle 310. Camera 308 provides image data transmitted by mobile device 306 to vehicle 310 (e.g., using communication interface 112). In one example, mobile device 306 transmits the image data to server 132, which re-transmits the image data to communication interface 112. The image data can be used by mobile device 306 to determine the distance 330 between mobile device 306 and vehicle 312.

In one example, mobile device 306 transmits distance 330 and data regarding the location of mobile device 306 to vehicle 310. Vehicle 310 uses this data, along with a determination by vehicle 310 of its present location, to determine the distance from vehicle 310 to vehicle 312. In one example, the location of mobile device 306 and vehicle 310 is determined using a GPS sensor.

In one example, vehicle 312 includes sensors 314. Vehicle 310 can communicate with vehicle 312 using communication interface 112. In one example, vehicle 312 includes a communication interface similar to communication interface 112. Data provided from sensors 314 is transmitted from vehicle 312 to vehicle 310. Vehicle 310 receives the transmitted data and uses it for controlling the speed of vehicle 310. In one example, the received data from sensors 314 is a distance between vehicle 310 and vehicle 312 as determined by a processing device (not shown) of vehicle 312.

In one example, vehicle 310 can receive data from other vehicles such as vehicle 318 and/or vehicle 320. The data received from vehicles 318, 320 can be similar to data provided by vehicle 312.

In one example, vehicle 310 receives data from stationary camera 316. This data can be used by vehicle 310 to determine the distance 334 between stationary camera 316 and vehicle 312. In one example, stationary camera 316 determines distance 334. One example, vehicle 310 determines distance 334. Vehicle 310 uses its location, a location of stationary camera 316, and distance 334 to determine a following distance behind vehicle 312. In one example, stationary camera 316 transmits its location (e.g., GPS coordinates) to vehicle 310. In one example, stationary camera 316 is one of objects 124. In one example, the location of stationary camera 316 is determined by cruise control system 140 using digital map 122.

In one example, vehicle 310 communicates with the new sources of data using a networked system that includes vehicles and computing devices. The networked system can be networked via one or more communications networks (wireless and/or wired). The communication networks can include at least a local to device network such as Bluetooth or the like, a wide area network (WAN), a local area network (LAN), the Intranet, a mobile wireless network such as 4G or 5G (or proposed 6G), an extranet, the Internet (e.g., traditional, satellite, or high speed starlink internet), and/or any combination thereof. Nodes of the networked system can each be a part of a peer-to-peer network, a client-server network, a cloud computing environment, or the like. Also, any of the apparatuses, computing devices, vehicles, sensors or cameras used in the networked system can include a computing system of some sort. The computing system can include a network interface to other devices in a LAN, an intranet, an extranet, and/or the Internet. The computing system can also operate in the capacity of a server or a client machine in client-server network environment, as a peer machine in a peer-to-peer (or distributed) network environment, or as a server or a client machine in a cloud computing infrastructure or environment.

In some embodiments, vehicle 310 can process data (e.g., sensor or other data) as part of a cloud system. In one example, a cloud computing environment operates in conjunction with embodiments of the present disclosure. The components of the cloud computing environment may be implemented using any desired combination of hardware and software components.

The exemplary computing environment may include a client computing device, a provider server, an authentication server, and/or a cloud component, which communicate with each other over a network (e.g., via communication interface 112).

The client computing device (e.g., mobile device 304, 308) may be any computing device such as desktop computers, laptop computers, tablets, PDAs, smart phones, mobile phones, smart appliances, wearable devices, IoT devices, in-vehicle devices, and so on. According to various embodiments, the client computing device accesses services at the provider server (e.g., server 132, or processor 104).

The client computing device may include one or more input devices or interfaces for a user of the client computing device. For example, the one or more input devices or interfaces may include one or more of: a keyboard, a mouse, a trackpad, a trackball, a stylus, a touch screen, a hardware button of the client computing device, and the like. The client computing device may be configured to execute various applications (e.g., a web browser application) to access the network.

The provider server may be any computing device configured to host one or more applications/services. In some embodiments, the provider server may require security verifications before granting access to the services and/or resources provided thereon. In some embodiments, the applications/services may include online services that may be engaged once a device has authenticated its access. In some embodiments, the provider server may be configured with an authentication server for authenticating users and/or devices. In other embodiments, an authentication server may be configured remotely and/or independently from the provider server.

The network may be any type of network configured to provide communication between components of the cloud system. For example, the network may be any type of network (including infrastructure) that provides communications, exchanges information, and/or facilitates the exchange of information, such as the Internet, a Local Area Network, Wide Area Network, Personal Area Network, cellular network, near field communication (NFC), optical code scanner, or other suitable connection(s) that enables the sending and receiving of information between the components of the cloud system. In other embodiments, one or more components of the cloud system may communicate directly through a dedicated communication link(s).

In various embodiments, the cloud system may also include one or more cloud components. The cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, either one or both of the provider server and the authentication server may be configured to operate in or with cloud computing/architecture such as: infrastructure as a service (IaaS), platform as a service (PaaS), and/or software as a service (SaaS).

Figure 4:
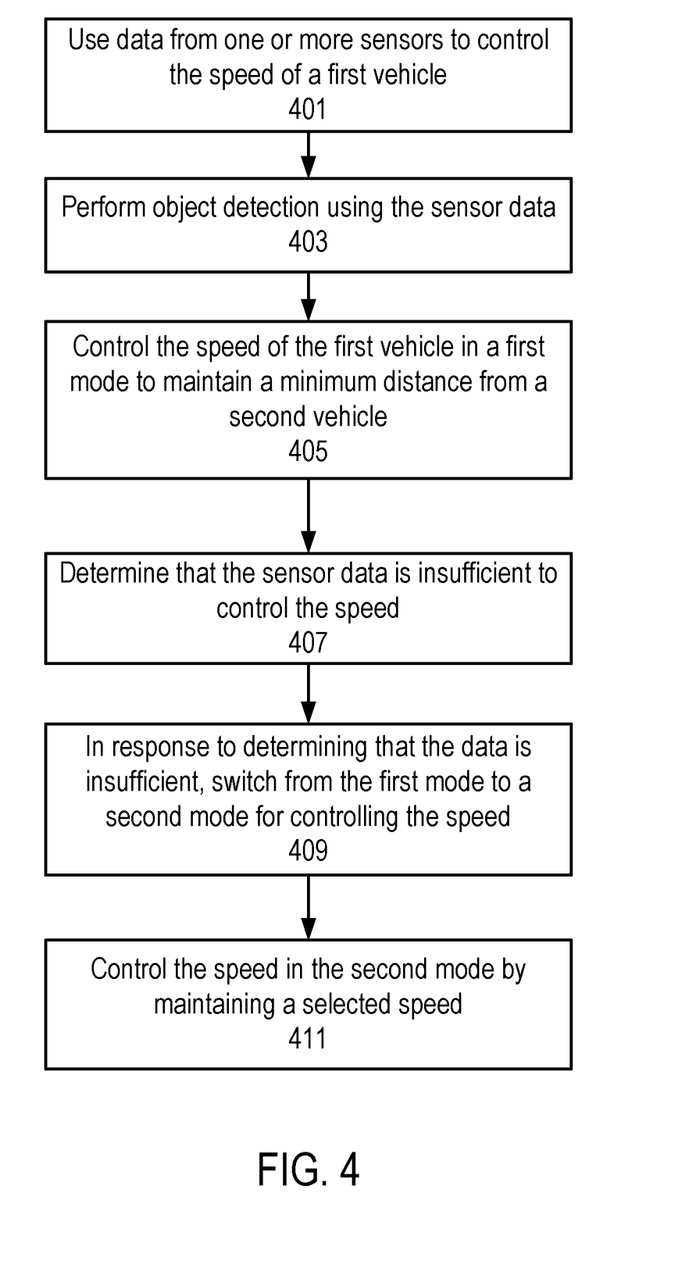
FIG. 4 shows a method for operating a cruise control system in two or more modes, in accordance with some embodiments.

FIG. 4 shows a method for operating a cruise control system in two or more modes, in accordance with some embodiments. For example, the method of FIG. 4 can be implemented in the system of FIG. 1. In one example, cruise control system 140 controls vehicle 102 in either an adaptive cruise control mode or a conventional cruise control mode, and switches back-and-forth between the two modes (or more than two modes in other embodiments) in response to various evaluations and/or determinations. In one example, cruise control system 140 switches from the conventional cruise control mode back to the adaptive cruise control mode in response to determining that sensor data is again sufficient to control the speed of vehicle 102 (e.g., after the sun has set or risen, or is otherwise out of the sensor's field of view, and thus stray light distortion is gone).

In one example, cruise control system 140 switches from the conventional cruise control mode back to the adaptive cruise control mode in response to determining that data provided by one or more sensors satisfies a criterion. In one example, when sensor data is determined to be insufficient, cruise control system 140 switches from a first mode to a second mode in which additional data is obtained from a new source for controlling the speed of vehicle 102. In one example, the second mode includes operation in a conventional cruise control mode and/or the obtaining of additional data from one or more new sources.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processor 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, data from one or more sensors is used to control the speed of a first vehicle. For example, data from sensors 206 is used to control motor 204. In one example, data from sensors 108 is used as an input to machine learning model 110.

At block 403, the sensor data is used to perform object detection. In one example, machine learning model 110 is used to detect objects in image data from one or more cameras.

At block 405, the speed of the first vehicle is controlled in a first mode to maintain a selected distance (e.g., at least a desired or target distance) from a second vehicle. In one example, cruise control system 140 controls speed to a desired set point value, but subject to maintaining a minimum distance from another vehicle being followed. In one example, the minimum distance is based on an output from machine learning model 110. In one example, the minimum distance is based at least in part on the current speed of the first vehicle and/or the current speed of the second vehicle.

In one example, the distance is dynamically selected based on a context of at least one of the vehicles (e.g., a speed and/or separation distance).

At block 407, a determination is made that the sensor data is insufficient to control the speed of the first vehicle. For example, processor 104 determines that a control output from cruise control system 140 is not responding adequately or properly to input data from sensors 108 and/or other sources of data.

At block 409, in response to determining that the data is insufficient, operation of the first vehicle is switched from the first mode to a second mode for controlling the speed of the first vehicle. In one example, vehicle 102 switches from an adaptive cruise control mode to a conventional cruise control mode.

At block 411, the speed of the first vehicle is controlled in the second mode by maintaining a selected speed. In one example, the selected speed is a value or set point requested by operator 216.

Figure 5:
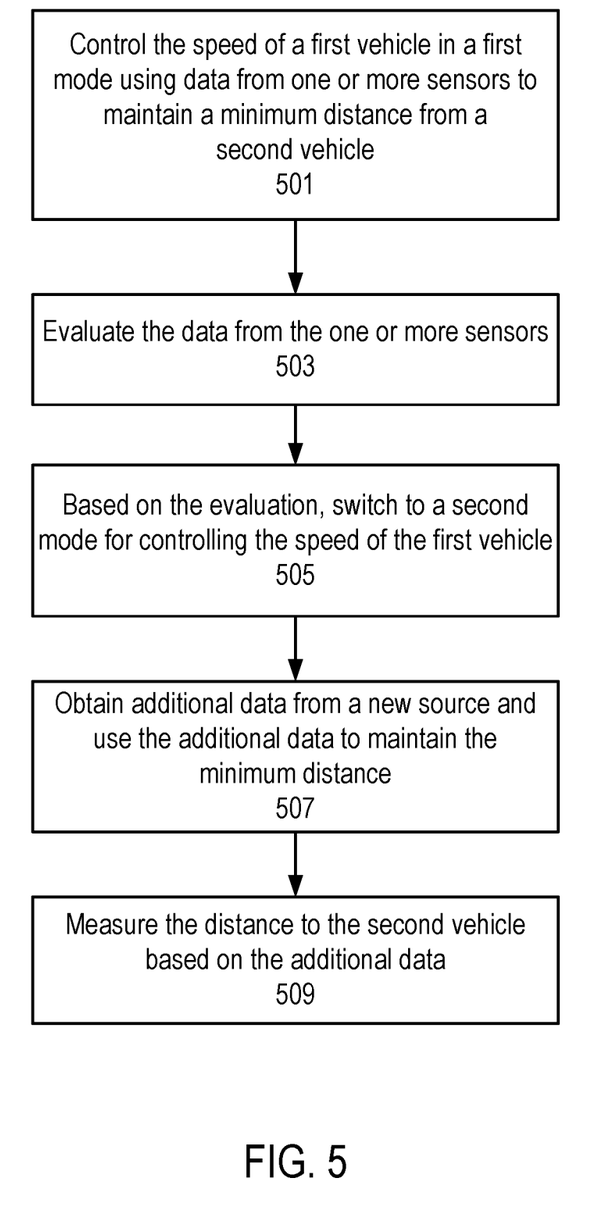
FIG. 5 shows a method for switching a cruise control mode based on evaluating data from sensors used to operate a vehicle, in accordance with some embodiments.

FIG. 5 shows a method for switching a cruise control mode based on evaluating data from sensors used to operate a vehicle, in accordance with some embodiments. For example, the method of FIG. 5 can be implemented in the system of FIGS. 1-3. In one example, vehicle 310 switches from a first mode of operation to a second mode of operation based on evaluating data from sensors 108. In the second mode of operation, additional data is obtained from other objects such as mobile device 304, mobile device 306, and/or vehicles 312, 318, 320 for use in controlling vehicle 310 in the second mode. Vehicle 310 returns to the first mode in response to determining that data from sensors 108 is sufficient to control the operation of vehicle 310.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., processor 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, the speed of the first vehicle is controlled in a first mode using data from one or more sensors. The speed is controlled to maintain a selected distance from a second vehicle. In one example, the selected distance is a minimum distance. In one example, the selected distance is a maximum distance. In one example, the selected distance is a range, such as a combination of a minimum and a maximum distance. In one example, the selected distance includes a desired set point distance, a minimum distance, and a maximum distance. In one example, the foregoing distance(s) are determined based on vehicle velocity (e.g., as measured or estimated based on data received or collected by a processor of the first vehicle) and/or other driving or operating conditions of the vehicle.

At block 503, the data from the one or more sensors is evaluated. In one example, the data is solely or additionally obtained from sensors 302, 314, and/or camera 302, 308.

At block 505, based on the evaluation, the first vehicle switches to a second mode for controlling the speed of the first vehicle. In one example, a vehicle switches between multiple modes depending on the current distance set point to which the vehicle is being then controlled (e.g., a different set point corresponding to each of a desired distance, a minimum distance, or a maximum distance) in a given operating context (e.g., different weather, traffic, and/or road conditions).

At block 507, additional data is obtained from a new source. The additional data is used to maintain the selected distance. Obtaining additional data is performed as a part of operating in the second mode. In one example, the additional data is obtained from vehicle 312 and stationary camera 316.

At block 509, the distance between the first vehicle and the second vehicle is measured based on the additional data. In one example, cruise control system 140 uses the measured distance to control the speed of vehicle 102, 202, or 310.

Figure 6:
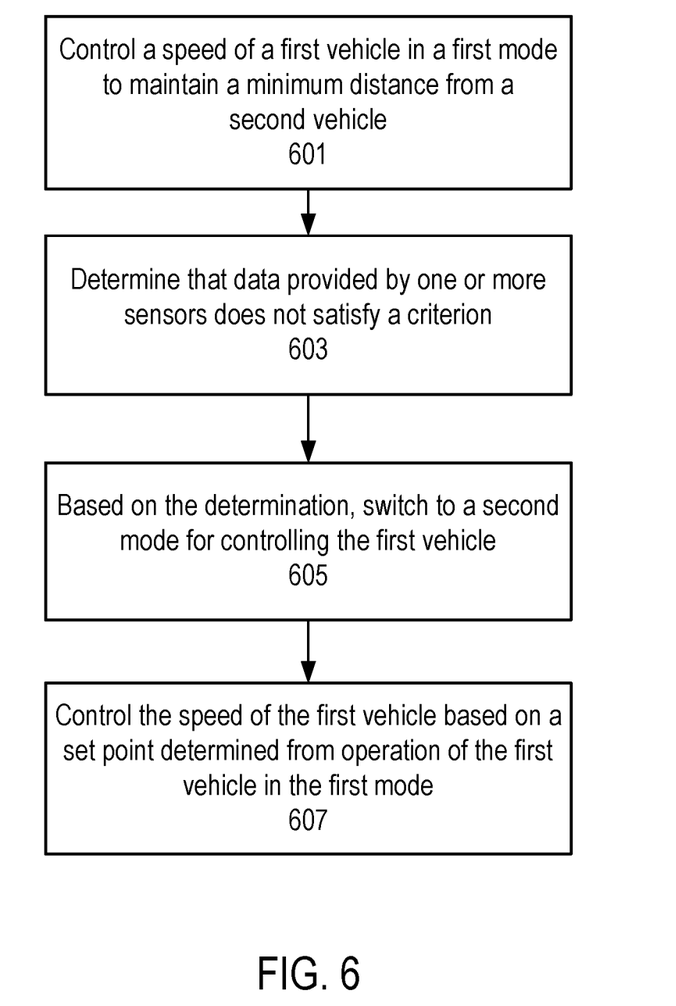
FIG. 6 shows a method for switching a cruise control mode based on determining that sensor data does not meet a criterion, in accordance with some embodiments.

FIG. 6 shows a method for switching a cruise control mode based on determining that sensor data does not meet a criterion, in accordance with some embodiments. For example, the method of FIG. 6 can be implemented in the system of FIGS. 1-3. In one example, vehicle 310 switches from a first mode to a second mode based on the sensor data received from sensors of vehicle 310 failing to meet a data characteristic criterion. In one example, vehicle 310 switches from the second mode to the first mode when the sensor data is determined to meet the data characteristic criterion and/or to meet a different data characteristic criterion.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., processor 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a speed of a first vehicle is controlled in a first mode to maintain at least a minimum distance from a second vehicle. In one example, the minimum distance is maintained based on distance 332 determined by mobile device 304.

At block 603, a determination is made that data provided by one or more sensors does not satisfy a criterion. In one example, it is determined by processor 104 that data from sensors 206 contains noise and/or errors that exceed a threshold.

At block 605, based on the determination, the first vehicle switches to a second mode for controlling one or more functions of the first vehicle. In one example, the first vehicle collects data only from sensors of the first vehicle in the first mode, and in the second mode additionally and/or alternatively collects data from sensors of other vehicles and/or objects (e.g., vehicle 318 mobile device 306).

At block 607, the speed of the first vehicle is controlled based on a set point determined from operation of the first vehicle in the first mode. The speed is controlled at least in part using the data collected from other vehicles/objects above. In one example, the set point is a desired speed requested by operator 216 of vehicle 202. In one example, the set point is based on the output from machine learning model 110. In one example, the set point is based on sensor data, context data, or other operating data stored in memory 114 and/or memory module 208.

In one embodiment, a system includes: at least one processing device (e.g., processor 104); and at least one memory (e.g., memory 114, memory module 208) containing instructions configured to instruct the at least one processing device to: control, in a first mode and using data from at least one sensor (e.g., sensors 108, 206), a speed of a first vehicle (e.g., vehicle 102, 202, 310), where controlling the speed in the first mode includes controlling the speed to maintain at least a minimum distance from a second vehicle; determine that the data from the sensor is insufficient to control the speed of the first vehicle; and in response to determining that the data from the sensor is insufficient to control the speed, switch from the first mode to a second mode for controlling the speed of the first vehicle, where controlling the speed in the second mode includes maintaining a selected speed (e.g., a set point selected by an operator of the first vehicle when in the first mode).

In one embodiment, maintaining the selected speed is performed independently of distance between the first vehicle and the second vehicle. For example, a conventional cruise control mode is used to control speed, and the distance to the second vehicle is not use as an input for the control.

In one embodiment, maintaining the selected speed includes using a set point for a cruise control system, where the set point is the selected speed.

In one embodiment, controlling the speed in the first mode further includes performing object detection using the data from the sensor, and the object detection includes detecting the second vehicle. In one example, the object detection is part of the processing performed in a navigation system used for controlling a direction and/or route of vehicle 102. In one example, the navigation system uses machine learning models 110 for object detection with image data from a lidar sensor and/or a camera(s) as input.

In one embodiment, at least one sensor includes at least one of a scanning sensor, a camera, a global positioning system (GPS) sensor, a lidar sensor, a microphone, a radar sensor, a wheel velocity sensor, or an infrared sensor.

In one embodiment, the system further includes a memory module (e.g., memory module 208) mounted in the first vehicle, where the memory module includes the processing device and at least one memory device configured to store the data from the sensor, and where the memory device includes at least one of a DRAM device, a NAND flash memory device, a NOR flash memory device, or a multi-chip package (MCP), or an embedded multi-media controller (eMMC) package including flash memory and a flash memory controller integrated on a same silicon die or in a same package.

In one embodiment, the system further includes a communication interface (e.g., communication interface 112) of the first vehicle, where the communication interface is configured to wirelessly communicate with at least one other object.

In one embodiment, the at least one other object includes a mobile device in the first vehicle (e.g., mobile device 304), a mobile device external to the first vehicle (e.g., mobile device 306), the second vehicle (e.g., vehicle 312), a vehicle traveling on a same road as the first vehicle (e.g., vehicle 320), or a moving vehicle within 500 meters of the first vehicle (e.g., vehicle 318).

In one embodiment, the communication interface is configured for vehicle-to-everything (V2X) communication including at least one of V2I (vehicle-to-infrastructure) communication, V2N (vehicle-to-network) communication, V2V (vehicle-to-vehicle) communication, V2P (vehicle-to-pedestrian) communication, V2D (vehicle-to-device) communication, or V2G (vehicle-to-grid) communication.

In one embodiment, the communication interface is a 5G cellular network interface.

In one embodiment, other object includes the second vehicle; and the instructions are further configured to instruct at least one processing device to receive data regarding at least one of a speed or position of the second vehicle. Determining that the data from the sensor is insufficient to control the speed of the first vehicle includes evaluating the received data regarding the speed or position of the second vehicle.

In one embodiment, the system further includes a user interface (e.g., user interface provided by display 212 and/or speaker 210), where the instructions are further configured to instruct the at least one processing device to, prior to switching to the second mode: provide an alert to an operator of the first vehicle; and in response to the alert, receive a confirmation from the operator to switch to the second mode.

In one embodiment, a method includes: controlling, in a first mode and using data from at least one sensor, a speed of a first vehicle, where controlling the speed in the first mode includes controlling the speed to maintain at least a minimum distance from a second vehicle; evaluating the data from the sensor; and switching, based on evaluating the data from the sensor, from the first mode to a second mode for controlling the speed of the first vehicle by obtaining additional data from a new source, and using the additional data to maintain the minimum distance.

In one embodiment, evaluating the data from the sensor includes determining that the data from the sensor is insufficient to control the first vehicle due to distortion caused by a light source shining on the sensor; switching to the second mode includes, in response to determining that the light source is causing distortion, obtaining the additional data from a camera (e.g., camera 302, 308) of the new source; and the new source is at least one of a vehicle other than the first vehicle, a mobile device, or a stationary camera (e.g., 316).

In one embodiment, the speed is controlled in the first mode by an adaptive cruise control (ACC) system (e.g., cruise control system 140); obtaining additional data from the new source includes obtaining data from at least one object external to the first vehicle; and using the additional data to maintain the minimum distance includes measuring a distance to the second vehicle based on the additional data.

In one embodiment, evaluating the data from the sensor includes determining that a light source (e.g., 226) external to the first vehicle is preventing adequate processing of the data from the sensor; obtaining additional data from the new source includes obtaining data from proximity-type sensors and/or image data from a camera of a mobile device that is in an interior of the first vehicle; and using the additional data to maintain the minimum distance includes measuring a distance to the second vehicle based on the image data and/or proximity data.

In one embodiment, the method further includes providing an indication to an operator of the first vehicle that the first vehicle will be switching to the second mode, or is currently controlling speed in the second mode.

In one embodiment, the method further includes: when controlling the speed in the first mode, providing a first user interface (e.g., display 212) to an operator of the first vehicle regarding an operational status of the first vehicle; and prior to switching to the second mode, receiving, via an input in a second user interface (e.g., a microphone to receive a voice command), a confirmation from the operator to switch to the second mode.

In one embodiment, a non-transitory computer-readable medium (e.g., storage media of memory module 208) stores instructions which, when executed on at least one computing device, cause the at least one computing device to: control, in a first mode, a speed of a first vehicle, where controlling the speed in the first mode includes controlling the speed to maintain at least a minimum distance from a second vehicle; determine that data provided by at least one sensor of the first vehicle does not satisfy a criterion; and in response to determining that the data from the sensor does not satisfy the criterion, switch from the first mode to a second mode for controlling the first vehicle, where controlling the first vehicle in the second mode includes controlling the speed based on a selected speed.

In one embodiment, the selected speed is a set point used in controlling the speed in the first mode.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically include one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
    an interface;
    at least one processing device; and
    at least one memory containing instructions configured to instruct the at least one processing device to:
        operate a first vehicle in a first mode of speed control in which data from at least one sensor of the first vehicle is usable to maintain at least a minimum distance from a second vehicle;
        determine that the data from the sensor is not usable to measure a distance from the first vehicle to the second vehicle, including determining that the sensor data is not usable to meet an accuracy criterion for distance measurement;
        in response to determining that the data from the sensor is not usable to measure distance, provide an alert to an operator of the first vehicle to operate the first vehicle in a second mode to maintain a constant speed of the first vehicle, and require a confirmation to be received from the operator in response to the alert, to change operation to the second mode.

2. The system of claim 1, wherein maintaining the constant speed is performed independently of distance between the first vehicle and the second vehicle.

3. The system of claim 1, wherein maintaining the constant speed comprises using a set pointfor a cruise control system.

4. The system of claim 1, wherein maintaining at least the minimum distance comprises performing object detection using the data from the sensor, and the object detection includes detecting the second vehicle.

5. The system of claim 1, wherein the at least one sensor includes at least one of a scanning sensor, a camera, a global positioning system (GPS) sensor, a lidar sensor, a microphone, a radar sensor, a wheel velocity sensor, or an infrared sensor.

6. The system of claim 1, further comprising a memory module mounted in the first vehicle, wherein the memory module includes the processing device and at least one memory device configured to store the data from the sensor, and wherein the memory device includes at least one of a DRAM device, a NAND flash memory device, a NOR flash memory device, a multi-chip package (MCP), or an embedded multi-media controller (eMMC) package including flash memory and a flash memory controller integrated on a same silicon die or in a same package.

7. The system of claim 1, further comprising a communication interface of the first vehicle, wherein the communication interface is configured to wirelessly communicate with at least one other object.

8. The system of claim 7, wherein the at least one other object includes a mobile device in the first vehicle, a mobile device external to the first vehicle, the second vehicle, a vehicle traveling on a same road as the first vehicle, or a moving vehicle within 500 meters of the first vehicle.

9. The system of claim 7, wherein the communication interface is configured for vehicle-to-everything (V2X) communication including at least one of V2I (vehicle-to-infrastructure) communication, V2N (vehicle-to-network) communication, V2V (vehicle-to-vehicle) communication, V2P (vehicle-to-pedestrian) communication, V2D (vehicle-to-device) communication, or V2G (vehicle-to-grid) communication.

10. The system of claim 7, wherein:
    the at least one other object includes the second vehicle; and
    the instructions are further configured to instruct the at least one processing device to receive data regarding at least one of a speed or position of the second vehicle;
    wherein determining that the data from the sensor is not usable to measure distance comprises evaluating the received data regarding the speed or position of the second vehicle.

11. A method comprising:
    controlling, in a first mode and using data from at least one sensor, a speed of a first vehicle, wherein controlling the speed in the first mode comprises controlling the speed to maintain at least a minimum distance from a second vehicle;
    evaluating the data from the sensor, including determining that a light source external to the first vehicle is preventing adequate processing of the data from the sensor;
    changing, based on evaluating the data from the sensor, from the first mode to a second mode for controlling the speed of the first vehicle by obtaining additional data from a new source, and using the additional data to maintain at least the minimum distance from the second vehicle, wherein the obtaining additional data from the new source comprises obtaining first image data from a camera of a mobile device that is in an interior of the first vehicle;
    wherein using the additional data to maintain the minimum distance comprises measuring a distance to the second vehicle based on the first image data.

12. The method of claim 11, wherein:
    evaluating the data from the sensor comprises determining that the data from the sensor is not usable to control the first vehicle due to distortion; and
    changing to the second mode comprises, in response to determining that the sensor data is not usable, obtaining the additional data from a stationary camera of the new source.

13. The method of claim 11, wherein:
    the speed is controlled in the first mode by an adaptive cruise control (ACC) system;
    obtaining additional data from the new source comprises obtaining data from at least one object external to the first vehicle; and
    using the additional data to maintain the minimum distance comprises measuring a distance to the second vehicle based on the additional data.

14. The method of claim 11, further comprising providing an indication to an operator of the first vehicle that the first vehicle will be changing to the second mode, or is currently controlling speed in the second mode.

15. The method of claim 11, further comprising:
when controlling the speed in the first mode, providing a first user interface to an operator of the first vehicle regarding an operational status of the first vehicle; and
prior to changing to the second mode, receiving, via an input in a second user interface, a confirmation from the operator to change to the second mode.

16. A non-transitory computer-readable medium storing instructions which, when executed on at least one computing device, cause the at least one computing device to:
control, in a first mode, a speed of a first vehicle, wherein controlling the speed in the first mode comprises controlling the speed to maintain at least a minimum distance from a second vehicle;
determine that data provided by at least one sensor of the first vehicle does not satisfy a criterion, wherein the criterion includes an accuracy threshold for distance measurement; and
in response to determining that the data from the sensor does not satisfy the criterion, change from the first mode to a second mode for controlling the first vehicle, wherein controlling the first vehicle in the second mode comprises controlling the speed at a constant speed, wherein the constant speed is one of: a set point used in controlling the speed in the first mode, a speed of the first vehicle in the first mode when it is determined that the data from the sensor does not satisfy the criterion, or a speed selected by a driver when a cruise control system of the first vehicle is activated.

17. The method of claim 11, wherein the obtaining additional data from the new source further comprises obtaining second image data from a camera of a mobile device that is operated by a person located outside of the first vehicle, and wherein using the additional data to maintain the minimum distance further comprises measuring the distance to the second vehicle further based on the second image data.

* * * * *